UNITED STATES PATENT OFFICE.

WILLIAM BURNLEY, OF MIAMISBURG, OHIO, ASSIGNOR TO JAMES A. BURNLEY, OF COTTONWOOD FALLS, KANSAS.

SOLDERING-FLUX.

SPECIFICATION forming part of Letters Patent No. 608,973, dated August 9, 1898.

Application filed June 3, 1895. Serial No. 551,515. (No specimens.)

*To all whom it may concern:*

Be it known that I, WILLIAM BURNLEY, a citizen of the United States, residing at Miamisburg, in the county of Montgomery and State of Ohio, have invented a new and useful composition of matter to be used as a flux or soldering-paste in uniting metallic bodies together with solder, of which the following is a specification.

The object of my invention is to produce a flux or soldering-paste that can be applied readily without requiring heat to soften it, capable of facilitating a perfect union between the metal parts to be soldered, which can be safely carried about in any position without danger of spilling and be conveniently applied under all conditions of use, and though free from the inconveniences of a liquid flux, such as liability to slopping or spilling, is yet plastic or semifluid and quite as easy of application to the parts to be soldered as is a liquid flux.

Experience shows that a saturated solution of zinc chlorid makes a good flux for soldering purposes; but any liquid flux is objectionable under many conditions of use, though having some points of excellence in that it flows readily and is easily applied to the parts where needed.

My composition of matter for a flux or soldering-paste consists of a flux in solution, such as a saturated solution of zinc chlorid and any grease which at ordinary temperatures will not liquefy, but remain in a pasty or plastic condition. The grease that I prefer to use in a mixture with solution of zinc chlorid is any of the residues thrown down in the distillation of petroleum, such as usually called "petrolatum," "vaseline," &c. The usual proportions in which I use these ingredients are as follows: petrolatum or vaseline, one pound; a fully-saturated solution of zinc chlorid, four table-spoonsful. These are thoroughly mixed by violent stirring until the mixture begins to thicken, when it is poured into the desired receptacles for use.

The above-named proportions will hold good for a mixture of zinc-chlorid solution with any pasty or plastic grease.

I do not wish, however, to limit myself to the exact proportions mentioned, as different proportions may be employed with good results, yet from experience I find the best results are obtained when the flux or soldering-paste is compounded as above stated. Neither do I wish to confine myself to the exact kind of grease or fatty substance used, only that it be in its nature at ordinary temperature pasty or plastic.

My invention is essentially a mixture of a flux in solution, such as a saturated solution of zinc chlorid with a fat or grease which is pasty or plastic at ordinary temperatures, for the purposes of a soldering flux or paste that can be readily applied by means of a brush or splint to the metal parts to be joined and which has all the convenience of a liquid flux without its objections. No heat is required to soften this paste. It is always plastic and can be readily applied under all conditions of use and with the best results in effecting a perfect union of parts to be soldered.

What I claim as my invention is—

1. The herein-described composition of matter as a flux or soldering-paste for use in joining bodies of metal with solder, the same consisting of a fat or grease that is plastic or pasty at ordinary temperatures, and a saturated solution of zinc chlorid, in or about the proportions specified.

2. The herein-described composition of matter as a flux or soldering-paste for use in joining bodies of metal with solder, the same consisting of petrolatum or vaseline, and a saturated solution of zinc chlorid, in or about the proportions specified.

3. A plastic flux or soldering-paste for use in joining bodies of metal with solder, the same consisting of a flux in solution mixed with a fat or grease that is pasty at ordinary temperatures, substantially as described.

WILLIAM BURNLEY.

Witnesses:
W. A. REITER,
EDWARD J. ROGERS.